US012720645B2

(12) United States Patent
Cho et al.

(10) Patent No.: US 12,720,645 B2
(45) Date of Patent: Aug. 25, 2026

(54) HEATING TRAY FOR VACUUM HOPPER PRECHARGER

(71) Applicants: Samsung SDI Co., Ltd., Yongin-si (KR); SAMSUNG MECHATRONICS CO., LTD., Hwaseong-si (KR)

(72) Inventors: Byoung Chul Cho, Yongin-si (KR); Hyun Gu Heo, Yongin-si (KR); Young Hak Pyo, Yongin-si (KR); Geun Sik Yoo, Yongin-si (KR); Jae Deuk Lee, Yongin-si (KR); Dae Lim Jung, Yongin-si (KR); Tae Kyu Kim, Yongin-si (KR); Jong Wook Bae, Yongin-si (KR)

(73) Assignees: Samsung SDI Co., Ltd., Yongin-si (KR); Samsung Mechatronics Co., Ltd., Hwaseong-si (KR)

( * ) Notice: Subject to any disclaimer, the term of this patent is extended or adjusted under 35 U.S.C. 154(b) by 790 days.

(21) Appl. No.: 18/004,039

(22) PCT Filed: May 10, 2022

(86) PCT No.: PCT/KR2022/006660
§ 371 (c)(1),
(2) Date: Dec. 30, 2022

(87) PCT Pub. No.: WO2022/240140
PCT Pub. Date: Nov. 17, 2022

(65) Prior Publication Data

US 2023/0309196 A1 Sep. 28, 2023

(30) Foreign Application Priority Data

May 11, 2021 (KR) ........................ 10-2021-0060652

(51) Int. Cl.
*H05B 3/22* (2006.01)
*H01M 10/04* (2006.01)

(52) U.S. Cl.
CPC .......... *H05B 3/22* (2013.01); *H01M 10/0404* (2013.01)

(58) Field of Classification Search
CPC ............ H01M 10/0404; H01M 10/615; H05B 3/0038; H05B 3/22; H05B 3/26;
(Continued)

(56) References Cited

U.S. PATENT DOCUMENTS 8,974,955 B2 3/2015 Min et al.
2010/0089902 A1* 4/2010 Wong ........................ H05B 3/34 219/494

(Continued)

FOREIGN PATENT DOCUMENTS

CN 103201890 A 7/2013
KR 10-1998-0069586 A 10/1998

(Continued)

OTHER PUBLICATIONS

International Search Report for PCT/KR2022/006660 dated Aug. 17, 2022, 4 pages.

(Continued)

*Primary Examiner* — Justin C Dodson
(74) *Attorney, Agent, or Firm* — Womble Bond Dickinson (US) LLP

(57) ABSTRACT

The present invention provides a heating tray for a vacuum hopper precharger, wherein a heating part is configured in a tray having a secondary battery mounted thereon to allow heat generated from the heating part to be circulated inside a vacuum hopper precharger and to be transferred to the entire secondary battery so that the activity of an electrolyte inside the secondary battery is improved, and according
(Continued)

thereto, a large amount of residual gas and impurities can be discharged so as to increase purity of the secondary battery. Particularly, the secondary battery can be fully charged with an electrolyte inside the vacuum hopper precharger, thereby improving productivity compared to a conventional configuration in which a secondary battery is charged with an electrolyte at 60% to 70% inside a vacuum hopper precharger and then charged with a remaining charge amount in another process so as to be fully charged.

10 Claims, 7 Drawing Sheets

(58) Field of Classification Search
CPC ................. H05B 3/68; H05B 2203/01; H05B 2203/028; H05B 2203/033; H05B 2214/02
See application file for complete search history.

(56) References Cited

U.S. PATENT DOCUMENTS

2013/0244093 A1 9/2013 Min et al.
2015/0131979 A1* 5/2015 Kohl ........................ F24H 9/14 392/479
2021/0399349 A1 12/2021 Jung

FOREIGN PATENT DOCUMENTS

KR 10-0532357 B1 12/2005
KR 10-2015-0107115 A 9/2015
KR 10-2016-0014368 A 2/2016
KR 10-1865134 B1 6/2018
KR 10-2018-0085123 A 7/2018
KR 10-1957503 B1 3/2019
KR 10-2299967 B1 9/2021
WO WO 2020/138715 A1 7/2020

OTHER PUBLICATIONS

Extended European Search Report for Application No. 22807788.9, dated Nov. 7, 2025, 8 pages.
Chinese Notification of First Office Action, for Patent Application No. 202280016567.0, dated Jun. 12, 2026, 9 pages.

* cited by examiner

-PRIOR ART-

-PRIOR ART-

-PRIOR ART-

HEATING TRAY FOR VACUUM HOPPER PRECHARGER

CROSS-REFERENCE TO RELATED APPLICATION(S)

This application is a National Phase Patent Application of International Patent Application Number PCT/KR2022/006660, filed on May 10, 2022, which claims priority of Korean Patent Application No. 10-2021-0060652, filed May 11, 2021. The entire contents of both of which are incorporated herein by reference.

TECHNICAL FIELD

The present invention relates to a heating tray for a vacuum hopper precharger and, more specifically, to a heating tray for a vacuum hopper precharger, wherein a heating part is configured in a tray having a secondary battery mounted thereon to allow heat generated from the heating part to be circulated inside a vacuum hopper precharger and to be transferred to the entire secondary battery so that the activity of an electrolyte inside the secondary battery is improved, and according thereto, a large amount of residual gas and impurities can be discharged so as to increase purity of the secondary battery.

BACKGROUND ART

Secondary batteries, which are easy to apply according to product groups and have electrical characteristics such as high energy density, are being commonly applied not only to portable devices but also to electric vehicles (EVs) or hybrid electric vehicles (HEVs) driven by an electric driving source. These secondary batteries are attracting attention as a new energy source for eco-friendliness and energy efficiency improvement in that they have primary advantage of drastically reducing the use of fossil fuels and do not generate any by-products due to the use of energy.

Types of secondary batteries that are currently widely used include lithium ion batteries, lithium polymer batteries, nickel cadmium batteries, nickel hydride batteries, nickel zinc batteries, and the like. The operating voltage of such a unit secondary battery cell, that is, a unit battery cell, is about 25 V to 45 V. Therefore, when an output voltage higher than this is required, a battery pack may be configured by connecting a plurality of battery cells in series. In addition, a battery pack may be configured by connecting a plurality of battery cells in parallel according to a charge/discharge capacity required for the battery pack. Accordingly, the number of battery cells included in the battery pack may be variously set according to a required output voltage or charge/discharge capacity.

Meanwhile, when a battery pack is configured by connecting a plurality of battery cells in series/parallel, it is common to configure a battery pack by first configuring a battery module including at least one battery cell, and adding other components by using the at least one battery module.

As such battery cells, a recent trend is to widely use pouch-type secondary batteries as lithium polymer batteries. Pouch-type secondary batteries have high energy density per unit weight and volume and are easily used to make battery cells thinner and lighter, and thus have recently been widely used.

A method for manufacturing a conventional battery cell as a pouch-type secondary battery is as follows.

First, a positive electrode plate and a negative electrode plate are manufactured, a separator is interposed therebetween, and then stacked to manufacture an electrode assembly. Thereafter, a plasticizer (DBP) is extracted from the electrode assembly manufactured in the above-described manner, and electrode tabs are welded to electrode leads of the electrode assembly to be embedded inside a pouch case. After the electrode assembly is embedded in the pouch case, an electrolyte is injected into the pouch case so as to be so that impregnated in the electrode assembly. When the electrolyte solution is injected as described above, the edge of the pouch case is joined by thermal fusion to seal the pouch case. Thereafter, an aging process is performed to stabilize the assembled battery cell as described above, and then a charge/discharge process for activating the battery cell is performed. However, during the charging and discharging process, an irreversible reaction between the electrolyte and additives may occur due to SEI layer formation, and gas is generated at this stage. The gas inside the pouch case needs to be removed, and if the gas is not removed, the battery cell may be defective. Therefore, a degassing process is performed using a degassing device of a battery cell to remove gas inside the pouch case.

As a prior patent related to the above-described battery cell degassing device, that is, a vacuum hopper precharger, as shown in FIG. 1, a gas removing device for a secondary battery, of Patent Literature 1, comprises a chamber 200 installed on a base 100, wherein the chamber 200 is composed of an upper chamber 210 that moves up and down and a lower chamber 220 installed on the upper surface of the base 100 by a fixed leg 110. The reference numbers depicted in FIG. 1 are described in Patent Literature 1 (Korean Registered Patent Publication 10-0433836).

In addition, as shown in FIG. 2, a battery cell degassing device for degassing a battery cell provided with a gas pocket 59, of patent literature 2, comprises: a chamber cover 100 on which the battery cell is detachably seated; a vacuum chamber 200 which is coupled to the chamber cover 100 according to sliding of the chamber cover 100 in a horizontal direction and accommodates the battery cell in a vacuum atmosphere; a piercing part 300 which is provided in the vacuum chamber 200 and pierces a part of the gas pocket part 59; and a pressing part 400 which is provided in the vacuum chamber 200 to be spaced apart from the piercing part 300 and discharges gas inside the battery cell to the outside of the battery cell while flattening the upper and lower surfaces of the battery cell. The reference numbers depicted in FIG. 2 are described in Patent Literature 2 (Korean Registered Patent Publication 10-2018-0062835).

However, in the prior art stated above, since the gas inside a battery cell is removed by making a chamber vacuum to remove the gas inside the battery cell of secondary battery, a lot of time is required to make the chamber vacuum and a lot of time is required to release the vacuum inside the chamber by injecting air after removing the gas, which is problematic.

In order to solve this problem, as shown in FIG. 3, the present inventor applied for and registered a vacuum hopper precharger comprising: a base frame 20 which is placed on the ground and has an inner space 21; a gas removal part 30 which is installed on the upper part of the inner space 21 of the base frame 20 and removes gas inside a secondary battery 100; a lifting part 40 which is installed in the lower part of the position corresponding to the gas removal part 30 in the inner space 21 of the base frame 20, has the secondary battery 100 placed thereon, and is for moving the secondary battery 100 up and down; and a control part 50 for controlling the gas removal part 30 and the lifting part 40. The reference numbers depicted in FIG. 3 are described in Patent Literature 3 (Korean Registered Patent Publication 10-1957503).

Meanwhile, in the vacuum hopper precharger registered by the present inventor, an electrolyte of a secondary battery and gas contained in the electrolyte are sucked through a vacuum hopper, the gas contained in the electrolyte is discharged to the outside, and the electrolyte is stored in a vacuum nozzle of the vacuum hopper to then be supplied to the inside of the secondary battery, and thus there is an effect of reducing defects of the secondary battery and extending the lifespan thereof. However, the electrolyte supplied by a tray and charged in the secondary battery is not fully charged in the vacuum hopper precharger and is recharged in another process after charging 60% to 70%, which is problematic.

Accordingly, in order to solve the problem, the present inventor has developed a technique for fully charging an electrolyte in a vacuum hopper precharger.

PRIOR ART LITERATURES

Patent Literatures (Patent literature 1) Patent literature 1: Korean Registered Patent Publication 10-0433836 (Registered 20 May 2004) Gas eliminating device for secondary battery (Patent literature 2) Patent literature 2: Korean Registered Patent Publication 10-2018-0062835 (Published 11 Jun. 2018) Battery cell degassing device (Patent literature 3) Patent literature 3: Korean Registered Patent Publication 10-1957503 (Registered 6 Mar. 2019) Vacuum hopper precharger

DESCRIPTION OF EMBODIMENTS

Technical Problem

Therefore, the present invention has been proposed to improve such problems of prior art, and the present invention provides a new type of vacuum hopper heating tray for precharger, wherein, by constructing a heating part in the tray on which a secondary battery is mounted, the heat generated from the heating part circulates inside the vacuum hopper precharger so that the heat is transferred to the entire secondary battery, and thus the activity of an electrolyte inside the secondary battery is improved, and as a result, a lot of residual gas and impurities are discharged to increase the purity of the secondary battery.

In particular, the present invention provides a new type of vacuum hopper heating tray for precharger, wherein, by allowing an electrolyte to be fully charged in a secondary battery inside the vacuum hopper precharger, productivity can be improved, compared to a conventional configuration in which a secondary battery is charged with an electrolyte at 60% to 70% inside a vacuum hopper precharger and then charged with a remaining charge amount in another process so as to be fully charged.

Solution to Problem

According to the features of the present invention for achieving the above object, provided is a heating tray for a vacuum hopper precharger (100) for discharging an electrolyte of a secondary battery mounted on a tray (10) and gas contained in the electrolyte to the outside, and supplying the electrolyte to the inside of the secondary battery, the heating tray comprising: a base frame (20) in which the tray (10) is made in a frame shape; an upper plate (30) which is coupled to an upper portion of the base frame (20); a heating part (40) which is coupled to an upper portion of the upper plate (30); and a mounting part (50) which is located on the upper portion of the heating part (40) and has a plurality of mounting grooves (51) into which the secondary battery is inserted and mounted.

In the heating tray for a vacuum hopper precharger according to the present invention, the heating part (40) may include: a fixed frame (41) which is fixed to the upper plate (30); a heating plate (42) which is located on the upper part of the fixed frame (41) and is for generating heat; an insulation plate (43) which is located between the fixed frame (41) and the heating plate (42) and is for preventing heat generated from the heating plate (42) from escaping to the lower side; and a cover (44) which has the heating plate (42) and the insulation plate (43) positioned therein and has a lower portion fixed to the fixed frame (41).

In addition, in the heating tray for a vacuum hopper precharger according to the present invention, the heating part (40) may include a detection sensor (45) for detecting and controlling the temperature of heat generated by the heating plate (42).

In addition, in the heating tray for a vacuum hopper precharger according to the present invention, the base frame (20) may have formed therein a cable duct (21) in which a cable connected to the heating part (40) is located.

Advantageous Effects of Disclosure

As described above, according to the heating tray for a vacuum hopper precharger according to the present invention, by configuring a heating part in a tray having a secondary battery mounted thereon to allow heat generated from the heating part to be circulated inside the vacuum hopper precharger and to be transferred to the entire secondary battery so that the activity of an electrolyte inside the secondary battery is improved, and according thereto, a large amount of residual gas and impurities can be discharged so as to increase purity of the secondary battery.

In particular, by allowing an electrolyte to be fully charged in a secondary battery inside the vacuum hopper precharger, productivity can be improved, compared to a conventional configuration in which a secondary battery is charged with an electrolyte at 60% to 70% inside a vacuum hopper precharger and then charged with a remaining charge amount in another process so as to be fully charged.

| [Description of symbols for main parts of drawing] | |
|---|---|
| 10: Heating tray for vacuum hopper precharger | |
| 20: Base frame | 21: Cable duct |
| 30: Upper plate | 40: Heating part |
| 41: Fixed frame | 42: Heating plate |
| 43: Insulation plate | 44: Cover |
| 45: Detection sensor | 50: Mounting part |
| 51: Mounting groove | |

BEST MODE

Figure 1:
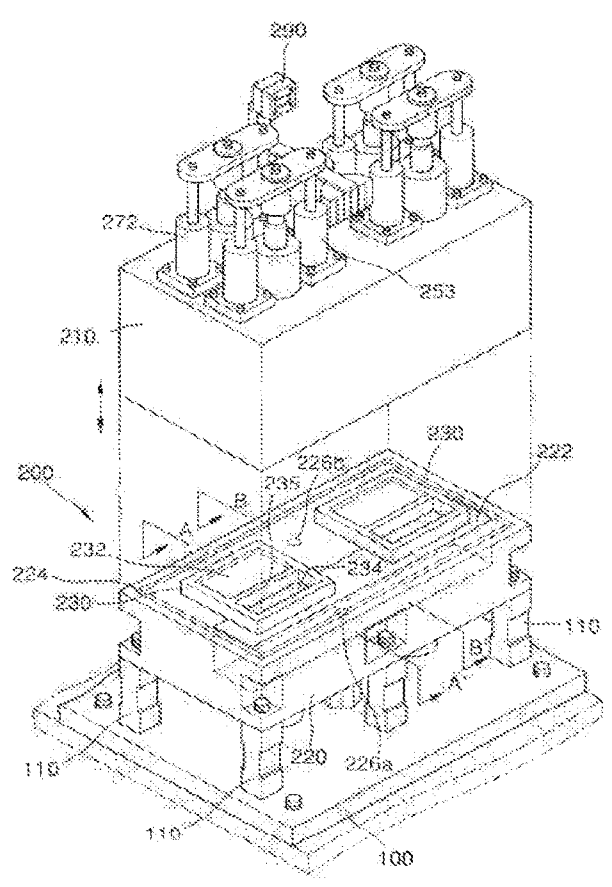
FIGS. 1 and 2 are diagrams for explaining the prior art.
Figure 2:
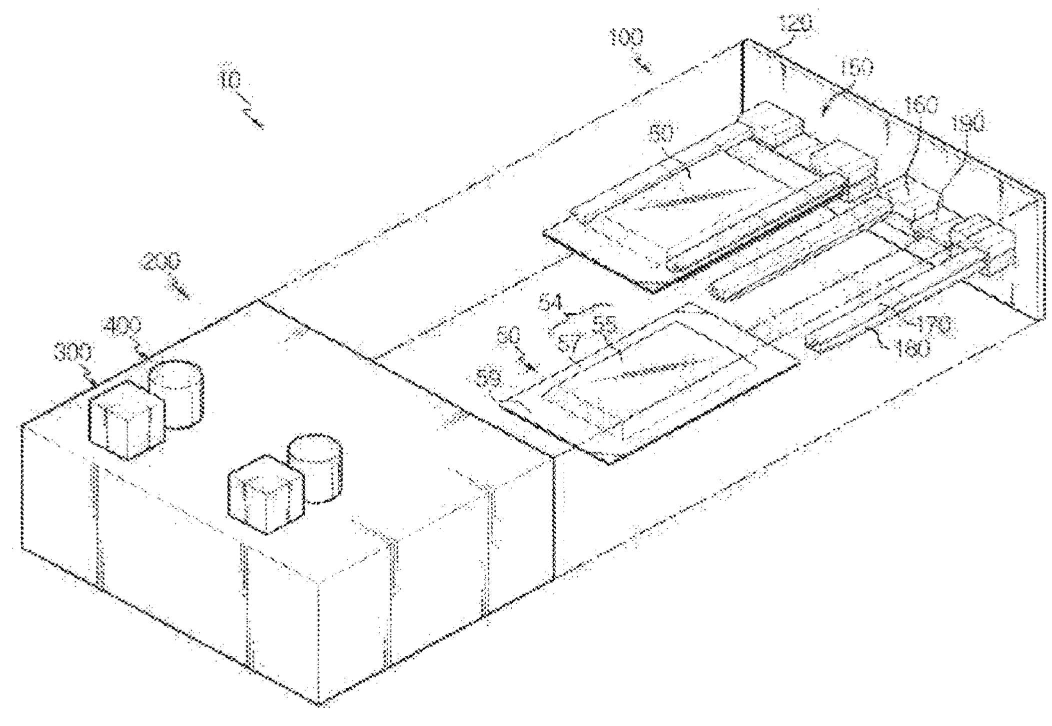
Figure 3:
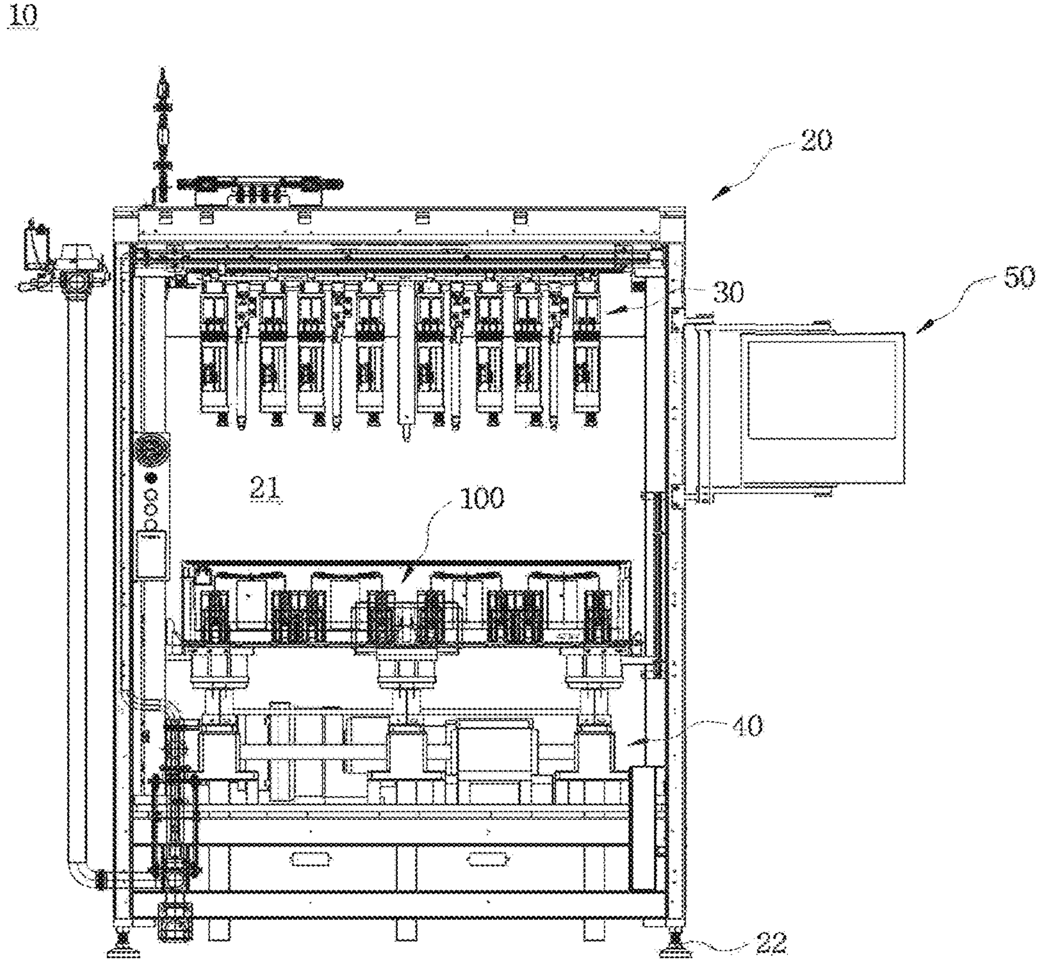
FIG. 3 is a front view of a vacuum hopper precharger registered by the present inventor.
Figure 4:
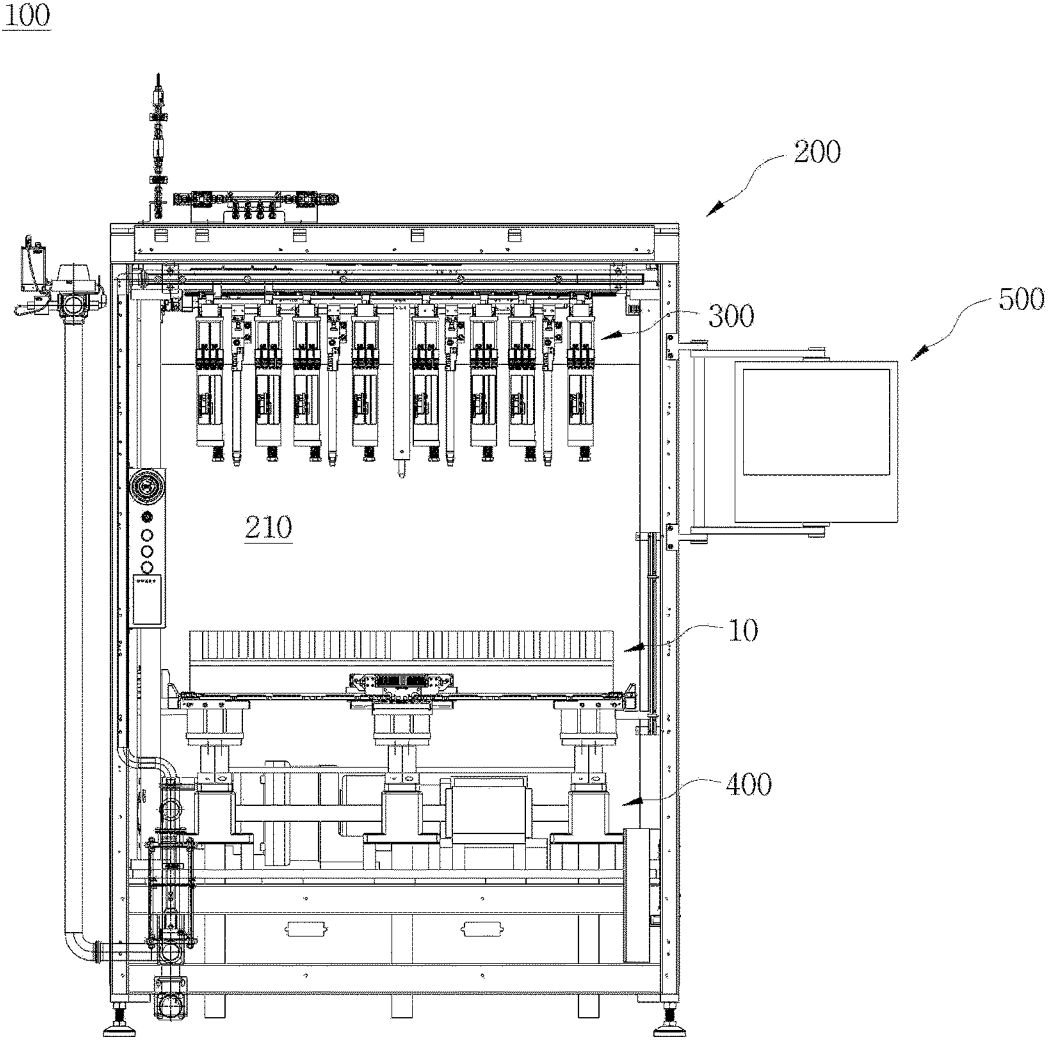
FIG. 4 is a front view of a vacuum hopper precharger according to a preferred embodiment of the present invention.
Figure 5A:
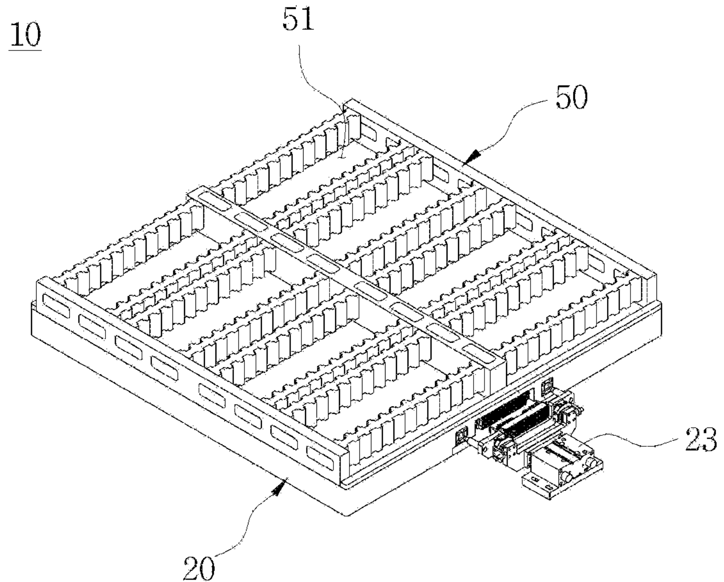
FIG. 5A is a perspective view of a heating tray for a vacuum hopper precharger according to a preferred embodiment of the present invention.
Figure 5B:
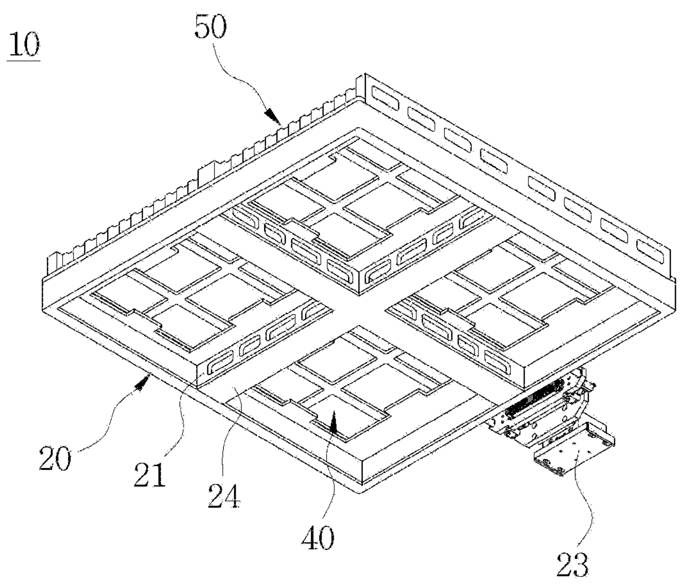
FIG. 5B is a bottom perspective view of a heating tray for a vacuum hopper precharger according to a preferred embodiment of the present invention.
Figure 6:
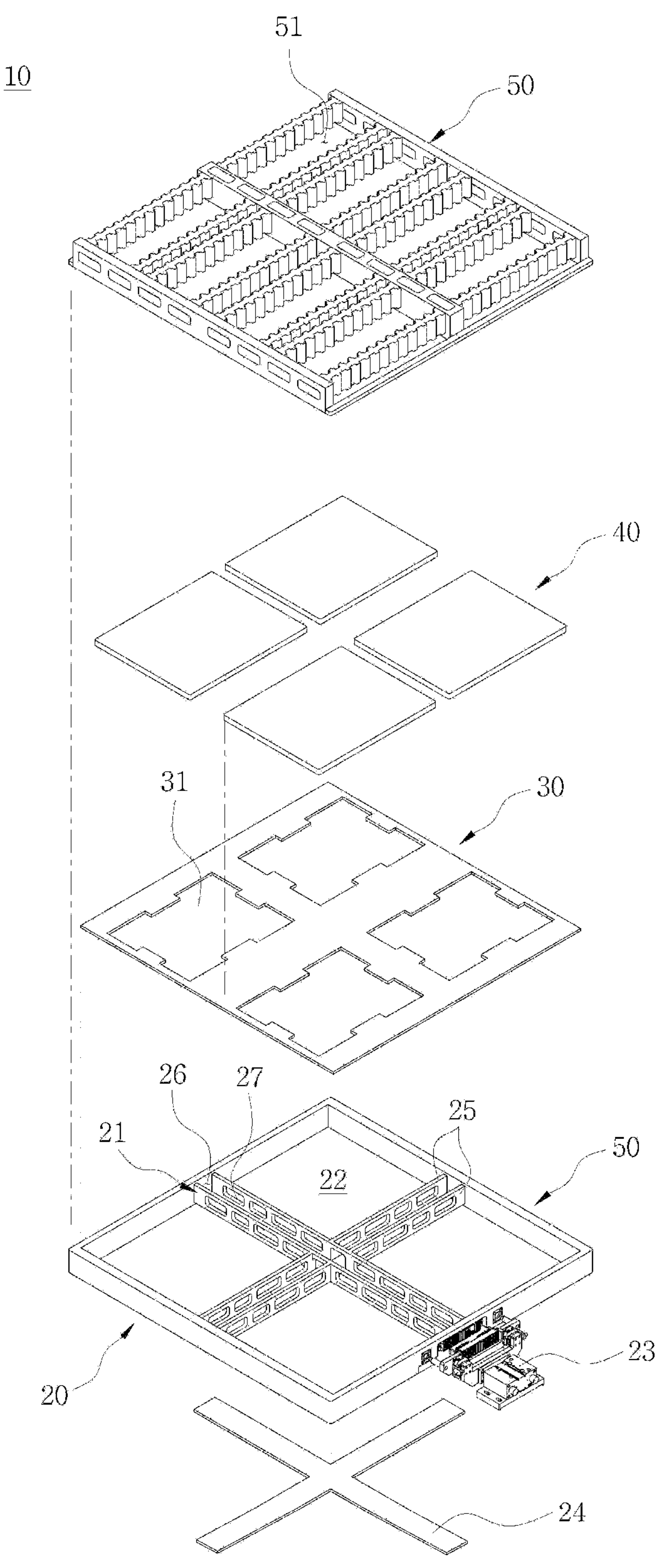
FIG. 6 is an exploded perspective view of a heating tray for a vacuum hopper precharger according to a preferred embodiment of the present invention.
Figure 7:
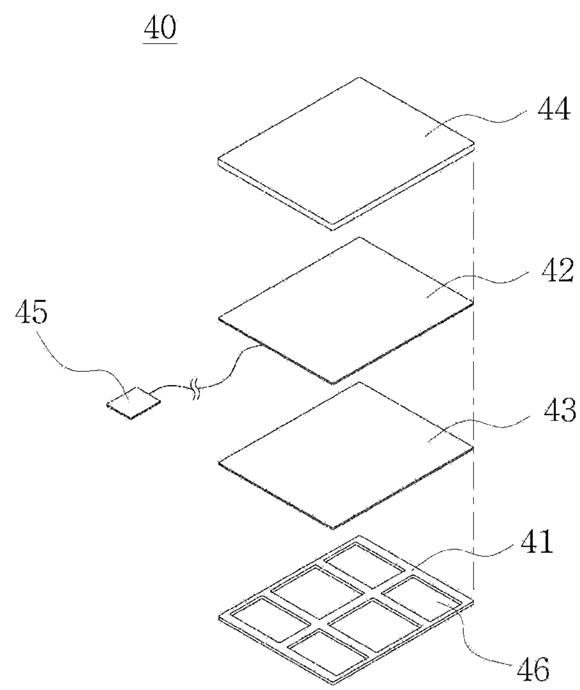
FIG. 7 is a view showing a heating part in a heating tray for a vacuum hopper precharger according to a preferred embodiment of the present invention.

Hereinafter, a preferred embodiment of the present invention will be described in detail with reference to the accompanying drawings, and the same reference numerals are given to components performing the same functions in FIGS. 4 to 7. Meanwhile, in the drawings and detailed description, detailed descriptions and illustrations of specific technical configurations and actions of elements not directly related to the technical features of the present invention are omitted, and only the technical configurations related to the present invention are briefly shown or explained.

Referring to FIGS. 4 to 7, the heating tray 10 for a vacuum hopper precharger according to a preferred embodiment of the present invention, which is put into a vacuum hopper precharger 100 to discharge the gas of a secondary battery and then to charge an electrolyte, wherein the vacuum hopper precharger 100 comprises: a base frame 200 which is placed on the ground and has an inner space 210; a gas removal part 300 which is installed on the upper part of the inner space 21 of the base frame 200 and removes gas inside a secondary battery; a lifting part 400 which is installed in the lower part of the position corresponding to the gas removal part 300 in the inner space 210 of the base frame 200, has the secondary battery placed thereon, and is for moving the secondary battery up and down; and a control part 500 for controlling the gas removal part 300 and the lifting part 400.

Meanwhile, the configuration of the above-described vacuum hopper precharger 100 corresponds to the vacuum hopper precharger 100 registered by the present inventor, and detailed descriptions thereof are omitted. The heating tray 10 for a vacuum hopper precharger according to a preferred embodiment of the present invention will now be described.

The heating tray 10 for a vacuum hopper precharger according to a preferred embodiment of the present invention includes a base frame (20) in which the tray (10) is made in a frame shape, an upper plate (30) which is coupled to an upper portion of the base frame (20), a heating part (40) which is coupled to an upper portion of the upper plate (30), and a mounting part (50) which is located on the upper portion of the heating part (40) and has a plurality of mounting grooves (51) into which the secondary battery is inserted and mounted.

The base frame 20 is formed in the shape of a rectangular frame having an inner space 22, and a connect 23 is formed on one side to be connected to the control unit 500 of the vacuum hopper precharger 100. In addition, in the inner space 22, a cable duct 21 is formed so that a cable connecting the heating part 40 and the connect 23, which will be described later, is located, and a duct cover 24 is formed at the bottom of the cable duct 21 to prevent the cable from escaping to the outside.

Meanwhile, in the cable duct 21, a plurality of plates 25 are spaced apart on the inner space 22 of the base frame 20 to form a space 26, and a cable is positioned on the space 26. At this time, the plurality of plates 25 are formed to have a plurality of holes 27 so as to reduce the weight.

The upper plate 30 is coupled to the upper portion of the base frame 20, and one or more holes 31 are formed therein. Here, the one or more holes 31 correspond to the number of heating parts 40 to be described later. In the present invention, since the heating part 40 includes four heating parts, the holes 31 formed in the upper plate include four holes.

The heating part 40, which is coupled to the upper part of the upper plate 30 and is for generating heat, may include a fixed frame 41 fixed to the upper plate 30, a heating plate 42 located on top of the fixed frame 41 and generating heat, an insulation plate 43 located between the fixed frame 41 and the heating plate 42 to prevent heat generated from the heating plate 42 from escaping to the lower side, and a cover 44 which has the heating plate 42 and the insulation plate 43 positioned therein and has the lower part there fixed to the fixed frame 41. Here, the fixed frame 41 has a plurality of holes 46 formed therein to reduce the weight.

Meanwhile, the heating part 40 includes a detection sensor 45 for detecting and controlling the temperature of heat generated by the heating plate 42. In a preferred embodiment of the present invention, the detection sensor 45 is configured to be connected to the heating plate 42 to detect the temperature of the heating plate 42, which is, however, only an embodiment, and may be fixed to the lower part of the fixed frame 41 to detect the temperature of the heating plate 42.

As described above, the temperature detected by the detection sensor 45 is transmitted to the control part of the vacuum hopper precharger 100, and the control part 500 controls the temperature of the heating plate 42 so that the temperature detected by the detection sensor 45 can maintain a set temperature.

The mounting part 50, which is for mounting the secondary battery therein, has formed therein a plurality of mounting grooves 51 in which the secondary battery is mounted.

The operation of the vacuum hopper precharger 100 into which the heating tray 10 having the above-described configuration is put will now be described. The heating tray 10 having the secondary battery mounted therein is put into a predetermined position on the upper side of the elevation part 400 of the vacuum hopper precharger 100. Then, the connect 23 of the heating tray 10 and the control part 500 are connected through a cable, and the heating part 40 generates heat at the temperature set by the control part 500. Here, the heating part 40 is maintained at a preset temperature in a separate space (place) before being introduced into the vacuum hopper precharger 100, and then introduced into a predefined position on the upper side of the elevation part 400 of the vacuum hopper precharger 100. Thereafter, a side fan and a center fan of the vacuum hopper precharger 100 operate, and the heat generated in the heating tray 10 is circulated inside as the side fan and the center fan operate, and is transferred to the secondary battery and is transferred to the secondary battery.

As described above, according to the heating tray for the vacuum hopper precharger according to the present invention, by configuring a heating part in a tray having a secondary battery mounted thereon to allow heat generated from the heating part to be circulated inside a vacuum hopper precharger and to be transferred to the entire secondary battery, the activity of an electrolyte inside the secondary battery can be improved, and according thereto, a large amount of residual gas and impurities can be discharged so as to increase purity of the secondary battery.

In particular, by allowing an electrolyte to be fully charged in a secondary battery inside the vacuum hopper precharger, productivity can be improved, compared to a conventional configuration in which a secondary battery is charged with an electrolyte at 60% to 70% inside a vacuum hopper precharger and then charged with a remaining charge amount in another process so as to be fully charged.

While the foregoing embodiment has been provided for carrying out the heating tray for a vacuum hopper precharger according to a preferred embodiment of the present invention, it should be understood that the embodiment described herein should be considered in a descriptive sense only and not for purposes of limitation, and various changes in form and details may be made therein without departing from the spirit and scope of the disclosure as defined by the following claims.

The invention claimed is:

1. A heating tray for a vacuum hopper precharger for discharging an electrolyte of a secondary battery mounted on the heating tray and gas contained in the electrolyte to the outside, and supplying the electrolyte to the inside of the secondary battery, the heating tray comprising:

a base frame;

an upper plate which is coupled to an upper portion of the base frame;

at least one heating part which is coupled to an upper portion of the upper plate; and a mounting part which is located on the upper portion of the at least one heating part and has a plurality of mounting grooves arranged in a plurality of columns or rows, each mounting groove of the plurality of mounting grooves being configured to accommodate the secondary battery, wherein the base frame has formed therein a cable duct in which a cable connected to the at least one heating part is located, wherein a plurality of plates are arranged in an inner space of the base frame, wherein the plates are spaced apart from each other to form a space, and wherein the space defines the cable duct and the cable of the cable duct is arranged in the space.

2. The heating tray of claim 1, wherein the at least one heating part comprises:

a fixed frame which is fixed to the upper plate;

a heating plate which is located on the upper part of the fixed frame and is for generating heat;

an insulation plate which is located between the fixed frame and the heating plate and is for preventing heat generated from the heating plate from escaping to a lower side of the at least one heating part; and a cover which has the heating plate and the insulation plate positioned therein and has a lower portion fixed to the fixed frame.

3. The heating tray of claim 2, wherein the at least one heating part comprises a detection sensor for detecting and controlling the temperature of heat generated by the heating plate.

4. The heating tray of claim 1, wherein holes are formed in the plates.

5. The heating tray of claim 1, wherein a duct cover is arranged under the cable duct.

6. The heating tray of claim 5, wherein the duct cover is formed along a surface the shape of the plates.

7. The heating tray of claim 1, wherein a plurality of holes are formed in the upper plate.

8. The heating tray of claim 7, wherein the at least one heating part comprises a plurality of heating parts spaced apart from each other.

9. The heating tray of claim 8, wherein a number of heating parts corresponds to a number of holes in the upper plate.

10. The heating tray of claim 2, wherein a plurality of holes are formed in the fixed frame.

* * * * *